US008478311B2

(12) United States Patent
Sennett et al.

(10) Patent No.: US 8,478,311 B2
(45) Date of Patent: Jul. 2, 2013

(54) INTELLIGENT FORWARDING OF SHORT MESSAGE SERVICE AND MULTIMEDIA MESSAGING SERVICE MESSAGES

(75) Inventors: DeWayne Allan Sennett, Redmond, WA (US); Brian Kevin Daly, Seattle, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 1049 days.

(21) Appl. No.: 12/054,271

(22) Filed: Mar. 24, 2008

(65) Prior Publication Data
US 2009/0239556 A1 Sep. 24, 2009

(51) Int. Cl.
*H04W 4/00* (2009.01)

(52) U.S. Cl.
USPC ............. 455/466; 455/456.1; 455/412.1; 455/404.2; 370/328; 370/331

(58) Field of Classification Search
USPC ......... 455/466, 456.1, 412.1, 404.2; 370/328, 370/331
See application file for complete search history.

(56) References Cited

U.S. PATENT DOCUMENTS

| 5,109,770 | A | 5/1992 | Uribe et al. | |
|---|---|---|---|---|
| 5,526,748 | A | 6/1996 | Schleinz et al. | |
| 5,812,795 | A | 9/1998 | Horovitz et al. | |
| 6,151,507 | A | 11/2000 | Laiho et al. | 455/466 |
| 6,662,017 | B2 | 12/2003 | McCann et al. | 455/461 |
| 6,819,932 | B2 | 11/2004 | Allison et al. | 455/466 |
| 6,980,131 | B1 * | 12/2005 | Taylor | 340/994 |
| 7,269,431 | B1 * | 9/2007 | Gilbert | 455/466 |
| 7,319,880 | B2 | 1/2008 | Sin | 455/466 |
| 7,506,863 | B2 | 3/2009 | Berke | |
| 7,764,946 | B1 * | 7/2010 | Sennett et al. | 455/404.1 |
| 2003/0121984 | A1 | 7/2003 | Pinchen et al. | |
| 2003/0147518 | A1 | 8/2003 | Albal et al. | |
| 2004/0156491 | A1 | 8/2004 | Reding et al. | |
| 2004/0268265 | A1 * | 12/2004 | Berger | 715/752 |
| 2005/0064884 | A1 * | 3/2005 | Dumont et al. | 455/466 |
| 2005/0208957 | A1 * | 9/2005 | Knotts | 455/466 |
| 2005/0249344 | A1 | 11/2005 | Mueller et al. | |
| 2005/0277431 | A1 * | 12/2005 | White | 455/466 |
| 2006/0040678 | A1 * | 2/2006 | Kwon | 455/456.3 |
| 2006/0135142 | A1 | 6/2006 | Repka | |
| 2006/0222152 | A1 * | 10/2006 | Elias et al. | 379/88.13 |
| 2007/0040895 | A1 * | 2/2007 | Barbeau et al. | 348/14.01 |
| 2007/0067398 | A1 * | 3/2007 | Karmarkar | 709/206 |
| 2007/0238474 | A1 | 10/2007 | Ballas et al. | |
| 2008/0089497 | A1 | 4/2008 | Walter et al. | |
| 2008/0101370 | A1 * | 5/2008 | Marsico et al. | 370/392 |
| 2008/0201433 | A1 * | 8/2008 | McDonald | 709/206 |
| 2010/0124905 | A1 | 5/2010 | Pratt | |
| 2012/0115444 | A1 * | 5/2012 | Gravino et al. | 455/413 |

* cited by examiner

*Primary Examiner* — Nimesh Patel
(74) *Attorney, Agent, or Firm* — Woodcock Washburn LLP

(57) ABSTRACT

Various embodiments of the present disclosure describe techniques for intelligent SMS/MMS routing. In some example embodiments of the present disclosure information indicative of the location of a mobile device can be used by a service provider to determine where to route an incoming SMS/MMS message. In the same, and other embodiments different information can be used to determine where to route incoming SMS/MMS messages such as the electronic address of the originator of the message, and/or whether the mobile device the message is addressed to is in communication with local devices.

17 Claims, 7 Drawing Sheets

INTELLIGENT FORWARDING OF SHORT MESSAGE SERVICE AND MULTIMEDIA MESSAGING SERVICE MESSAGES

BACKGROUND

Short message service (SMS) and multimedia messaging service (MMS) are communication protocols that allow users to transmit short text messages and messages that include multimedia objects to mobile devices. As mobile devices become more prevalent, more and more people will rely on SMS and MMS services to exchange information. With more and more people using these services, there is an increasing need that the information contained in these messages be perceived by the intended recipient in a timely manner. There are situations where the indented recipient is in an area without cellular coverage, or in an area where it is expensive to receive these types of messages, e.g., when the user is roaming. In these and other situations there exists a need to improve SMS/MMS forwarding techniques.

SUMMARY

An embodiment describes a system, in one example embodiment, the system includes, but is not limited to circuitry configured to receive a message, wherein the message includes a body and an electronic destination address; circuitry configured to identify the location of a mobile device associated with the electronic destination address; circuitry configured to select an electronic forwarding address in accordance with the identified location of the mobile device; and circuitry configured to forward the body of the message to the electronic forwarding address. In addition to the foregoing, other system aspects are described in the detailed description, the figures and the claims.

An embodiment describes a method, in one example embodiment, the method includes, but is not limited to receiving, by a transceiver of a mobile device, a message; identifying, by the mobile device, a characteristic of the mobile device; selecting an electronic forwarding address in accordance with the identified characteristic, wherein the electronic forwarding address is stored on the mobile device; and transmitting, by the transceiver of the mobile device, the message to the electronic forwarding address. In addition to the foregoing, other method aspects are described in the detailed description, the figures and the claims.

An embodiment describes a computer readable storage medium, in one embodiment, the computer readable storage medium includes, but is not limited to instructions for receiving a message that includes an electronic destination address, wherein the electronic destination address is associated with a mobile device; instructions for identifying a characteristic of the mobile device; instructions for identifying an electronic forwarding address associated with the identified characteristic stored in a database management program; and instructions for forwarding the message to the electronic forwarding address. In addition to the foregoing, other computer readable storage medium aspects are described in the detailed description, the figures and the claims.

It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

DETAILED DESCRIPTION

Figure 1:
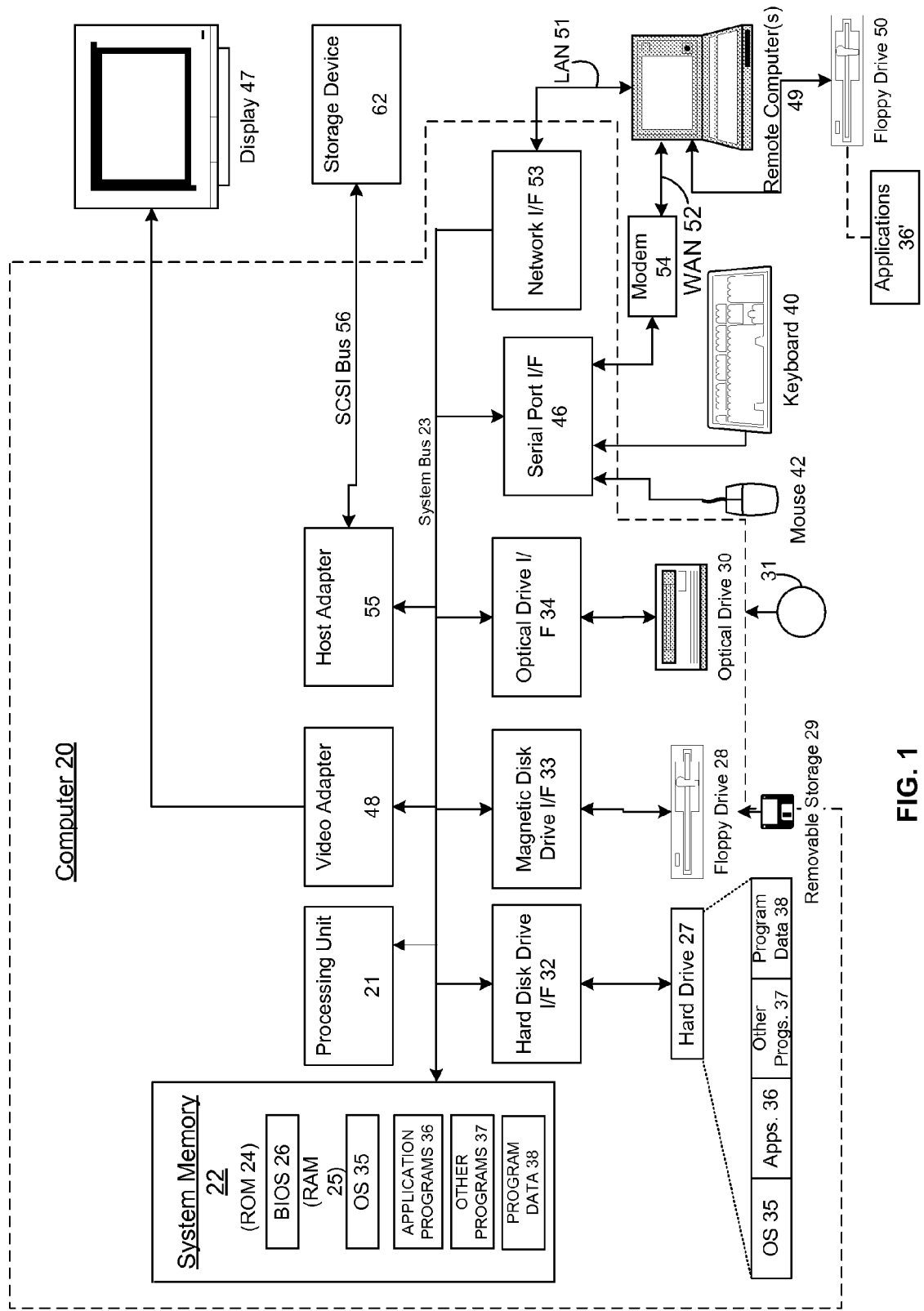
FIG. 1 depicts an example computer system configured effectuate aspects of the present disclosure.

Numerous embodiments of the present disclosure may execute on a computer. FIG. 1 and the following discussion are intended to provide a brief general description of a suitable computing environment in which the disclosure may be implemented. Although not required, the disclosure will be described in the general context of computer executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the disclosure may be practiced with other computer system configurations, including hand held devices, multi processor systems, microprocessor based or programmable consumer electronics, network PCs, minicomputers, mainframe computers and the like. The disclosure may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. In some example embodiments computer executable instructions embodying aspects of the present disclosure may be stored in ROM 24, hard disk (not shown), RAM 25, removable magnetic disk 29, optical disk 31, and/or a cache of processing unit 21. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device is also connected to the system bus 23 via an interface, such as a video adapter 48. In addition to the display 47, personal computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise wide computer networks, intranets and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 2:
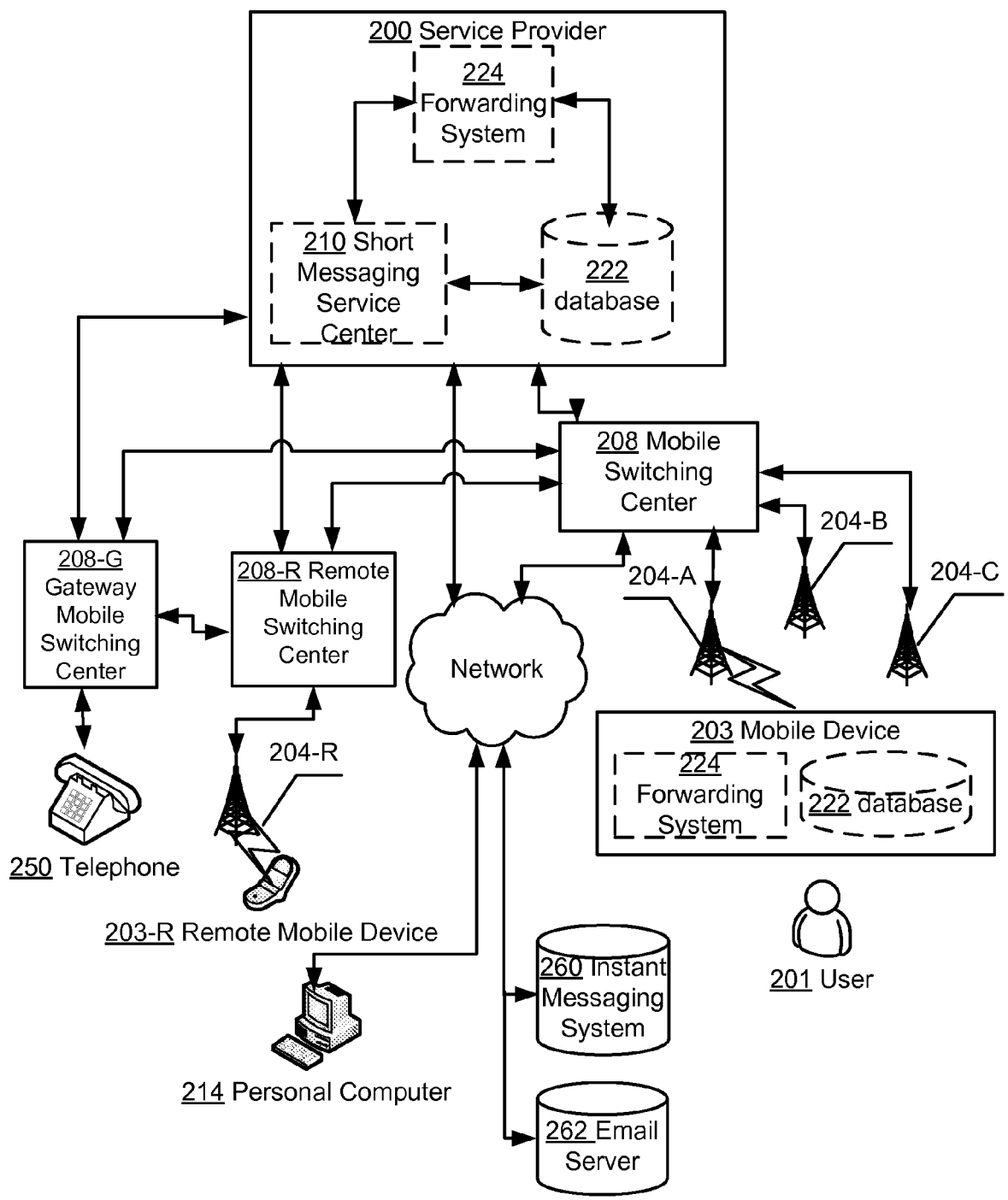
FIG. 2 depicts an example operational environment wherein aspects of the present disclosure can be implemented.

Referring now to FIG. 2, it generally illustrates an example operational embodiment for practicing aspects of the present disclosure. One skilled in the art will note that the example elements depicted in FIG. 2 are illustrated to provide an operational context for practicing aspects of the present disclosure and that in some embodiments the physical layout of such as system may be different, thus the example operational context is to be treated as illustrative only and in no way limit the scope of the claims.

As depicted by FIG. 2, in an embodiment a service provider 200 can be configured to send SMS/MMS messages to an electronic destination address associated with a mobile device 203. As depicted by FIG. 2, the service provider 200 can in some embodiments include circuitry, e.g., a combination of hardware, and/or software configured to effectuate a databases of information 222, a short messaging service center 210 (SMSC), and a forwarding system 224. One skilled in the art may note that elements 210, 222, and 224 are indicated in dashed lines, which is indicative of the fact that they are considered optionally located at their respective position in FIG. 2, e.g., in an example embodiment forwarding system 224 and database 222 may be located at a home location register of the service provider 200, or the database 222 could be part of a home location register and forwarding system 224 could be a part of the SMSC 210. In other example embodiments the forwarding system 224 can be distributed, e.g., a portion of the circuitry effectuating the forwarding system 224 may be physically located at the SMSC 210 while another portion may be located at a remote location such as the mobile switching center 208 (MSC). One skilled in the art can also appreciate that the forwarding system 224, SMSC 210 and database 222 are described herein as separate for clarity purposes, and that the disclosure is not limited to implementations depicted. More specifically, while the forwarding system 224 and database 222 are depicted, and described, as separate, one or more of them can be embodied in the same circuitry, i.e., in some embodiments that forwarding system 224 may be part of the same circuitry as database 222.

Continuing with the description of FIG. 2, a mobile device 203 is additionally depicted. One skilled in the art can appreciate that, while one mobile device 203 is depicted as connected to base station 204-A, base station 204-A can be configured to service multiple mobile devices (not shown). In addition to mobile device 203, a remote mobile device 203-R can similarly be connected to a remote base station 204-R. In some example embodiments mobile device 203 and remote mobile device 203-R may have components similar to computer 20 of FIG. 1, i.e., they may have a processing unit 21, system memory 22, keyboard 40, a display 47. In some embodiments mobile devices 203 and 203-R can be, for example, cellular phones, pocket personal computers, personal digital assistants, or other devices that can communicate via a wireless communications protocol, such as the advanced mobile phone system protocol, a code division multiple access protocol, a time division multiple access protocol, 802.11, etc. As illustrated by the dashed lines of FIG. 2, in some embodiments mobile device 203 can also include a forwarding system 224 and a database 222. In these example embodiments the mobile device 203 can be configured to forward messages alternatively, or in addition to, a forwarding system 224 operating at the location of the service provider 200.

Continuing with the description of FIG. 2, mobile device 203 can be configured to wirelessly communicate with a base station 204-A. While FIG. 2 depicts mobile device 203 in wireless communication with base station 204-A, mobile device 203 may also be configured to monitor signals from and/or transmit signals to base stations 204-B and 204-C. Generally, base stations 204-A through 204-C can include any equipment necessary for transmitting and receiving radio frequency (RF) signals from mobile device 203. One skilled in the art can appreciate that remote base station 204-R can operate in a manner similar to base station 204-A, however base station 204-R is located in a different area and could be managed by a different mobile switching center, e.g., remote mobile switching center 208-R.

The example system depicted in FIG. 2 also depicts a mobile switching center 208 that can be operably coupled to base stations 204-A through 204-C. The mobile switching center 208 can effectuate services, such as voice services, data services, fax services, and short message services using a computer system that can include components similar to those of computer 20 of FIG. 1. In some embodiments, the MSC 208 can be configured to effectuate these services using circuitry operable to determine which mobile devices are connected to base stations 204-A through 204-C; and manage communication channels allocated to the base stations 204-A through 204-C. In some example embodiments, the MSC 208 can be configured to additionally transmit information indicative of the location, and/or the identity of the devices it is currently servicing to database 222 of the service provider 200 so that incoming SMS/MMS messages and/or phone calls can be routed to the correct MSC. For ease of understanding, the mobile switching center 208 is depicted as including, for example, the hardware and software necessary to effect packet based transmissions over RF in addition to network switching subsystems and functionality disclosed herein. One skilled in the art can appreciate that remote mobile switching center 208-R and gateway mobile switching center 208-G can be configured to operate in a manner similar to mobile switching center 208. The gateway mobile switching center 208-G can also be configured to interface with the public switched telephone network in order to connect mobile subscribers with fixed endpoints such as telephone 250.

In general, a service provider 200 can facilitate the transfer of signals to and from the mobile devices over a mobile network using the components described above, e.g., the components of MSC 208/RMSC 208-R, base stations 204-A, 204-B, and 204-R, etc. In order to manage the mobile network, the database 222 can be configured to store information such as user accounts and/or location information that identifies the location of the mobile devices in the network and/or the identities of the mobile switching centers that service the mobile devices in the network. In some example embodiments, the database 222 can be effectuated by a computer that contains components similar to those of computer 20 of FIG. 1 and a database management program that can be stored in memory. The database management program can be configured to organize and manage the information stored in the file system of the database 222. In order to facilitate services such as voice, fax, SMS, MMS, at the like, the database 222 can be configured to store user accounts for each user such as user 201. In an example embodiment that involves a relational database, the database management program may organize the information in the file system of the database 222 into tables, rows, and columns. The database 222 can include a table that has information for the account of user 201 and the service provider 200 can generate a relationship between the user 201 and a mobile device 203 thereby associating user 201 with the mobile device 203. In addition, the database 222 can include the electronic address of the mobile device 203, e.g., a mobile telephone number, media access card number, a unique device identifier embedded in read only memory of the mobile device, or some other information that can be used to identify mobile device 203 as it is connected to network. In a specific example, a user 201 may subscribe to one or more services offered by service provider 200. Generally, if the service provider 200 offers cellular services, the service provider 200 can create a profile for the user 201 that includes a relationship linking the user's profile to an account for a mobile device 203 when user 201 subscribes to a service. If the mobile device 203 is a mobile phone for example, the service provider 200 can assign a phone number to the phone and associate that phone number with the mobile device 203 by linking the mobile phone number with a unique device identifier stored in, for example, a SIM card. In another embodiment, the user 201 may already have a mobile device 203, and provide the phone number of their device to the service provider 200 to associate the mobile device 203 with the user 201.

In some instances the service provider 200 can also include a short message service center (SMSC) 210 configured to receive SMS/MMS messages and route them to the correct mobile device. Generally, the SMSC 210 can include components similar to those of computer 20 of FIG. 1. The components of the SMSC 210 can be configured to receive short and multimedia messages from a variety of sources and deliver them to the appropriate destination. For example, in one instance, the SMSC 210 can be configured to receive a SMS or MMS message from a mobile device such as mobile device 203-R and scan the electronic destination address in the message. The SMSC 210 can then search database 222 for the electronic destination address and use this information to route the message to mobile device 203. The SMSC 210 in this example can be configured to send a request to the database 222 for the identity of the mobile switching center that is servicing electronic destination address of mobile device 203. The database 222 can be configured to reply with the identity of the mobile switching center and the SMSC 210 can be configured to transmit the SMS/MMS message to the identified mobile switching center. In other example embodiments, an operator of personal computer 214 can transmit a SMS message to the mobile device 203. In this example, personal computer 214 can include components similar to those of computer 20 of FIG. 1. The operator of personal computer 214 can execute a browser application stored in memory of personal computer 214 and the browser can be configured to render a website configured to receive input such as an electronic address of mobile device 203 and text and/or multimedia object(s). The input can be transmitted in one or more packets of information to the SMSC 210.

In embodiments of the present disclosure the SMSC 210 can additionally be configured to route SMS/MMS messages to other destinations such as to a telephone 250 that can for example include a user interface operable to display messages, an instant messaging system 260, and/or an email server 262. For example, in certain instances the SMSC 210 can be configured to determine that the electronic destination address is an email address. In this case the SMSC 210 can be configured to route an email to an email server 262 that handles the email address. In some embodiments of the present disclosure, an email server 262 can include one or more computers that can have components similar to those of computer 20 described in FIG. 1. In some embodiments the email server 262 can include web servers operable to receive packet based signals from a network such as the Internet. The email server 262 can store emails in a database and retrieve the emails when appropriate credentials are received and authenticated. In some instances the email server 262 can be accessed via a web browser of a personal computer such as personal computer 214, a web browser of a mobile device 203, and/or by an email application stored in memory of a personal computer such as personal computer 214 and/or an email application stored in memory of a mobile device 203.

In some example embodiments the SMSC 210 can be configured to transmit the information in a MMS/SMS message to an instant message alias associated with an instant messaging system 260. The instant messaging system 260 can be coupled to a network such as the Internet. The instant messaging system 260 can include a database of user accounts and the IP addresses associated with each account that is currently connected to the system. The instant messaging system 260 can be configured to receive messages addressed to one or more aliases and transmit the messages to the IP address currently associated with the aliases. In the instance that a message is received from the SMSC 210 addressed to an alias, the instant messaging system 260 can be configured to identify an IP address of a computer that is running an instant messaging client associated with the alias and send the message to that IP address. If for example, the alias is off-line, the message can be stored in a queue until the user logs back into the system.

Figure 3:
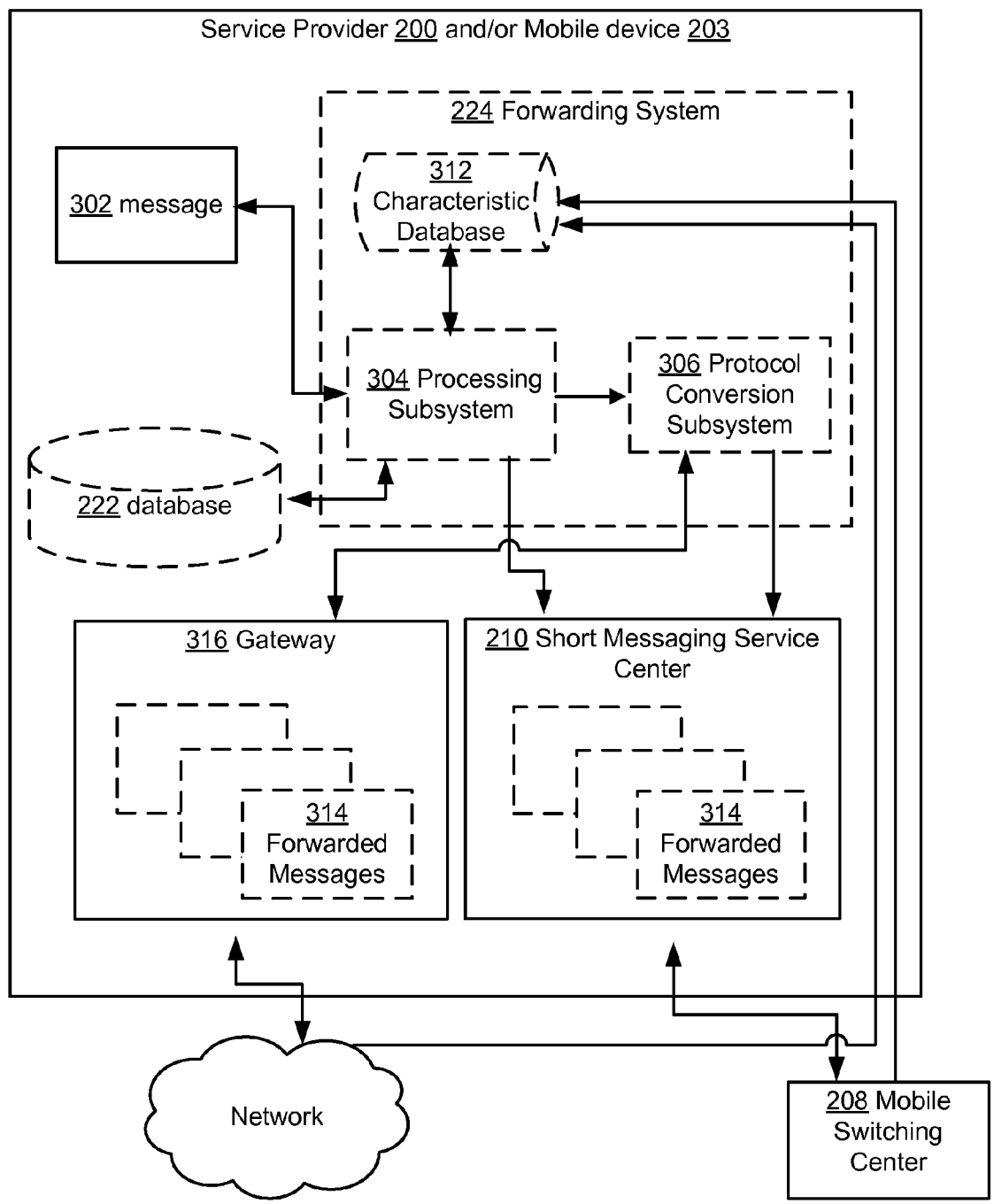
FIG. 3 depicts an example forwarding system.

Referring now to FIG. 3, it depicts an example forwarding system 224 according to an example embodiment of the present disclosure. For example, in some example embodiments the forwarding system 224 can be effectuated by circuitry that can include specialized computer circuits that embody logic operable to forward messages based on certain conditions. In other instances, the circuitry operable to effectuate the forwarding system 224 can include a general purpose processing unit configured by software instructions that embody logic operable to forward messages based on certain conditions. In this example embodiment an implementer may write source code embodying the logic and the source code could be compiled into machine readable code that can be processed by the general purpose processing unit. Since one skilled in the art can appreciate that the state of the art has evolved to a point where there is little difference between hardware, software, or a combination of hardware/software the selection of hardware versus software is left to an implementer. More specifically, one of skill can appreciate that a software process can be transformed into an equivalent hardware process, and a hardware process can itself be transformed into an equivalent software process. Thus, the selection of a hardware implementation versus a software implementation is one of design choice and left to the implementer. As stated above, in some embodiments the forwarding system 224 can be located at the service provider 200 and can be part of the SMSC 210, a home location register, or a stand alone system. In other embodiments the forwarding system 224 can be part of a mobile device 203. In other embodiments the forwarding system 224 can be distributed, e.g., a portion of it may operate at home location register and another portion may operate at the SMSC 210.

In General, FIG. 3 depicts example subsystems that can be used by a forwarding system 224. Similar to that describe above, the example subsystems can be effectuated by circuitry that can include specialized computer circuits or a general purpose processing unit configured by software instructions. As one of skill in the art can appreciate, the subsystems are provided for illustration purposes and other embodiments exist where certain subsystems are physically and/or logically integrated with each other. Thus, while FIG. 3 depicts a forwarding system 224 as containing certain subsystems, this embodiment is exemplarily and used for the purpose of clarity and other embodiments exist, thus the operational context of FIG. 3 is not limiting.

Continuing with the description of FIG. 3, in some embodiments a message 302 conforming to the simple messaging service protocol or the multimedia messaging service protocol can be received from a message sender that can be, for example, a personal computer 214, remote mobile device 203-R, etc. The message 302 can include a body, e.g., text and/or a multimedia object such as an electronic document, a digital photo, a digitized song, or a digitized video. The message 302 can additionally include metadata that can indicate for example, the size of the message, the type of attachment, e.g., photo, video, document, the time that the message was received, the electronic address of the sender, and an electronic destination address associated with a mobile device 203 such as the telephone number of mobile device 203 for example. In certain embodiments of the present disclosure, instead of routing the message 302 to the SMSC 210, the message 302 can be passed to a processing subsystem 304 configured to determine whether the message 302 should be routed as normal, or be forwarded according to aspects of the present disclosure.

In certain embodiments, the processing subsystem 304 can be configured to parse the metadata associated with the message 302 to identify, for example, the electronic originating address. The processing subsystem 304 can be configured to then lookup the electronic destination address in a table of electronic destination addresses that can be for example, stored in database 222. If the electronic destination address is not in the table, the processing subsystem 304 can be configured to route the message to the SMSC 210 where the SMSC 210 can deliver the message using techniques described above with respect to the discussion surrounding FIG. 2. If, on the other hand, the processing subsystem 304 determines that the electronic destination address is in the table the processing subsystem 304 can then identify one or more electronic forwarding addresses stored in database 222 for sending copies of the message 302.

As depicted by FIG. 3, the processing subsystem 304 can be configured to use characteristics of the mobile device 203 and/or information in the metadata of the message 302 to select one or more electronic forwarding addresses for message 302. For example, in some embodiments the database 222 can include multiple tables related to each other. The information in the tables can include information identifying sets of electronic forwarding addresses, e.g., one or more electronic forwarding addresses, and each set can be associated with a value, i.e., in some instances the value can be associated with a characteristic and/or the value can be associated with metadata of the message 302. The processing subsystem 304 can be configured to search for one or more values in database 222 and retrieve sets associated with the values. In a specific example, the processing subsystem 304 can be configured to obtain certain information indicative of a characteristic of the mobile device 203 and/or information from the metadata of the message and determine if the database 222 includes a set, e.g., at least one electronic forwarding address, that is associated with either a characteristic or information in the metadata.

In one example embodiment, information indicative of a characteristic of the mobile device 203 can include information that identifies the location of the mobile device 203. Additionally, or alternatively, in some example embodiments information indicative of a characteristic of the mobile device 203 can include information that indicates whether or not the mobile device 203 is in communication with one or more local devices, e.g., in one embodiment information that identifies that the mobile device 203 is connected via a 802.11 network can be considered a characteristic of the mobile device 203. In some embodiments characteristic information can be stored in characteristic database 312 that can have similar components as database 222, however in other embodiments the characteristic information can be stored in database 222 for example.

In at least one embodiment of the present disclosure, the processing subsystem 304 can be configured to use information obtained from the metadata of the message. In this example, the electronic originating address, the time that the message was received, the size of the message, and/or whether the message includes attachments and/or what type of attachments are included in the message 302 can be used to search for a set of electronic forwarding addresses. In a specific example, the processing subsystem 304 can be configured to parse the metadata of the message 302 and identify an electronic originating address, e.g., the address of the message originator. The processing subsystem 304 can be configured to search, a 'from' table stored in, for example, database 222 for the electronic originating address. If, for example, the electronic forwarding address is located in the table, the processing subsystem 304 can retrieve a set of electronic forwarding addresses associated with the electronic originating address.

In a specific example, the information in first and second rows of a first column in the example 'from' table can list, for example, two numbers indicative of two mobile devices, one belonging to the father of user 201 and the other belonging to a son of user 201. The rows of the table associated with the mobile device number belonging to the father can list a set of electronic forwarding addresses that can include, for example, an email account of user 201, and/or the instant message alias of user 201, etc. The row associated with the son of the user 201 can include a different set of electronic forwarding addresses that can include, for example, the mobile device number of the user's wife and the number of mobile device 203. In the instance that such a number is identified in a row of the first column of the example 'from' table, the processing subsystem 304 can retrieve the electronic forwarding addresses located in the row(s) associated with the column. In a specific example, the processing subsystem 304 can be configured to parse metadata of SMS message sent from the mobile device of the son of user 201. The processing subsystem 304 can be configured to search the database 222 for the number of the son's mobile device. In this example the processing subsystem 304 can find the number in the first column and retrieve the set of electronic forwarding addresses associated with the originating address, e.g., the wife's mobile device number and the user's mobile device number in this specific example.

In another specific example, the processing subsystem 304 can parse the metadata of message 302 and identify the time that the message 203 was received, and/or was sent by the originator. The processing subsystem 304 can be configured to search, an example 'time' table stored in, for example, database 222 for a time frame that includes the time identified in the metadata. If, for example, the an entry in the table includes the identified time, the processing subsystem 304 can retrieve a set of electronic forwarding addresses associated with the entry. For example, in one instance database 222 can include the example 'time' table that includes an entry for 9:00 am to 5:00 pm associated with an electronic forwarding address such as a work email address. In this specific example if a SMS message is received at 2:43 pm, the processing subsystem 304 can be configured to determine that the time or arrival for the message 302 is within the range 9:00 am to 5:00 pm and the processing subsystem 304 can be configured to retrieve the work email address associated with the entry. In certain embodiments of the present disclosure, the entries in the example 'time' table can additionally be associated with days of the week. For example, the entry for the time period 9:00 am to 5:00 pm described above can be associated with the days Monday through Friday. In this specific example, the processing subsystem 304 can be configured to retrieve the work email address when the message arrives during Monday through Friday and between the hours of 9:00 am to 5:00 pm.

In another example embodiment of the present disclosure, the processing subsystem 304 can be configured to retrieve information indicative of a characteristic of the mobile device 203 from characteristic database 312 and use characteristic information to retrieve a set of electronic forwarding addresses stored in for example, database 222. In an example embodiment, the location of the mobile device 203 can be determined by using various techniques such as the example techniques described below with respect to the discussion of FIG. 4 and/or FIG. 5. In response to receiving a message 302; and determining that the electronic destination address is associated with intelligent forwarding, the processing subsystem 304 can be configured to obtain characteristic information about the mobile device 203 stored in characteristic database 312. The processing subsystem 304 can then be configured to use at least one identified characteristic to search one or more tables in the database 222. In an example embodiment where a characteristic is indicative of the location of the mobile device 203, the processing subsystem 304 can be configured to search the database 222 for an entry in a 'location' table that is the same, or similar to the location of the mobile device 203. For example, a predetermined range around each entry in the 'location' table can be set by an administrator. If the identified location falls within the range of a entry in the 'location' table, then the processing subsystem 304 can determine that the location of the mobile device 203 is at the location associated with the entry in the table. In this instance the processing subsystem 304 can be configured to retrieve the set of electronic forwarding addresses associated with the location in the 'location' table.

In a specific example, the mobile device 203 can be located at the user's work location and, for example, the mobile device 203 can be equipped with a GPS radio. In embodiments where the forwarding system 224 is located at the service provider 200, the mobile device 203 can be configured to transmit one or more packets indicative of its location to the mobile switching center 208. The mobile switching center 208 can be configured to receive the location information and route the information to the characteristic database 312. In embodiments where the forwarding system 224 is located in the mobile device 203, the GPS coordinates can be stored locally. In example embodiments, the characteristic database 312 can include, for example, a table that identifies its location, whether it is connected to a docking station, whether it is connected to a wireless network, etc. In this example, a SMS message may be received by the service provider 200 and/or mobile device 203 addressed to the telephone number assigned to the mobile device 203. The processing subsystem 304 can in this example be configured to send a request to the characteristic database 312 requesting characteristic information. The processing subsystem 304 can be configured to receive information that identifies the GPS coordinates of the mobile device 203, and the processing subsystem 304 can be configured to check a 'location' table in database 222 for an entry that has the same, or similar GPS coordinates. In this specific example, the 'location' table may have an entry for work, e.g., the user 201 could have previously entered the GPS coordinates of his work office, or the user could have entered the street address of his work building and the characteristic database 312 could be configured to map the street address to GPS coordinates. In this example embodiment, the entry in the 'location' table associated with the address of the location where the user 201 works could include an electronic forwarding address such as the user's work email account. In this example, the processing subsystem 304 can be configured to identify that there is an entry associated with the current location of the mobile device 203 and retrieve the work email address.

In another example embodiment of the present disclosure the processing subsystem 304 can be configured to use information that identifies whether the mobile device 203 is connected to other local devices to identify electronic forwarding addresses. For example, in at least one embodiment the mobile device 203 can be configured to communicate with other local devices using physical connectors, e.g., USB cables, wireless adaptors, or RFID modules. For example, the mobile device 203 may include a short range wireless transceiver that can be configured to receive and send signals conforming to a protocol such as Bluetooth or 802.11. In this example the mobile device 203 can use such as transceiver to communicate with local devices such as routers, personal computers, telephones, and/or docking stations. A profile for each local device can be generated and can be stored locally on the mobile device 203 and/or stored in characteristic database 312 located at a service provider 200. When the mobile device 203 is connected to such a local device information reflecting the connection can be stored as a characteristic of the mobile device 203 in the characteristic database 312. In the instance that a SMS/MMS message is received while the mobile device 203 is connected to such a local device, the processing subsystem 304 can use the characteristic information in a search of database 222 and retrieve a set of electronic forwarding addresses associated with such a characteristic.

In a specific example, the user 201 could be located on a bus that includes a wireless network. The mobile device 203 can be configured to check, for example, the SSID of the wireless network and determine that a profile for this SSID is stored in memory. In embodiments where the forwarding system 224 is located at the service provider 200, the mobile device 203 can transmit one or more packets of information indicative of the SSID to the service provider 200 via the MSC 208 and a characteristic that reflects that the mobile device 203 is connected to the wireless network of the bus can be stored in the characteristic database 312. In the instance that a message 302 is received by the forwarding system 224. The processing subsystem 304 can be configured to search the characteristic database 312 and retrieve information that indicates that the mobile device 203 is connected to the wireless network of the bus. The processing subsystem 304 can then be configured to search a 'local device' table stored in database 222. In this example embodiment, the user 201 could have previously created a record in the database 222 indicative of wireless network of the bus and assigned it a set of electronic forwarding addresses. In this example, the processing subsystem 304 can identity that the 'local device' table includes the entry for the wireless network of the bus and retrieve the electronic addresses associated with the entry.

In certain embodiments of the present disclosure, the processing subsystem 304 may detect that multiple entries are valid when a message 302 is received. In one example, the processing subsystem 304 can be configured to retrieve every address for every entry that is associated with a valid entry, e.g., the processing subsystem 304 may find a set related to the location of the mobile device 203, a set related to the originator of the message, a set related to the size of the message, a set related to the type of attachment contained in the message, and a set related to whether the mobile device is in communication with a local device. In other embodiments however, the processing subsystem 304 can be configured to reduce the number of addresses retrieved by, for example, removing duplicative electronic forwarding addresses, and/or retrieving electronic forwarding addresses in accordance with a priority level assigned to either the entry, or the electronic forwarding address.

For example, in one embodiment of the present disclosure, the processing subsystem 304 can be configured to remove duplicative electronic forwarding addresses from a group of sets of electronic forwarding addresses. For example, the processing subsystem 304 could identify multiple sets of electronic forwarding addresses in response to receiving a message 302. In some instances the sets may include duplicative information, e.g., a set associated with a specific location may include the email address of user 201, and a set associated with a specific electronic originator address may also include the same email address. In these example embodiments, the processing subsystem 304 can be configured to scan the group of electronic forwarding addresses retrieved from database 222 and delete duplicates so that a specific electronic forwarding address doesn't receive multiple copies of the same message.

In addition to deleting duplicative addresses, in some embodiments of the present disclosure the processing subsystem 304 can be configured to determine whether any electronic forwarding addresses should be removed due to the presence of a set from a prioritized table. For example, in some embodiments the processing subsystem 304 may identify a plurality of sets of electronic forwarding addresses, however in some instances the user 201 may want sets from a certain table to trump other tables. For example, the user 201 may configure the forwarding system 224 to prioritize sets of addresses that are retrieved from a 'location' table. In this example if the processing subsystem 304 determines that the location of the mobile device 203 is stored in the 'location' table, and that the 'location' table is prioritized, the processing subsystem 304 can just retrieve the entry associated with the detected location.

In another embodiment of the present disclosure, the processing subsystem 304 can be configured to prioritize certain entries in certain tables. These entries can, for example, be used in conjunction with the prioritization of certain tables as is described above. In the example embodiment where entries can be prioritized. The processing subsystem 304 can be configured by user input to prioritize a work location stored in the 'location' table. In this example, if the location of the mobile device 203 is determined to be at work then the processing subsystem 304 can be configured to just retrieve the electronic address associated with the work location. In a specific example, a user 201 may only want messages forwarded to their email account while they are located at work. This prioritization may conflict with an entry in the 'from' table that states that messages from their brother be sent to the user's instant messaging alias. In this example, sets of electronic addresses can be associated with a priority level and the processing subsystem 304 can be configured to determine the priority level for each set and/or each table. In this example, the set of electronic addresses associated with the work location can have a higher priority than the set of addresses associated with messages from the mobile device associated with the brother of the user. In this embodiment, the processing subsystem 304 can just retrieve the set of electronic forwarding addresses associated with the work entry.

In at least one embodiment of the present disclosure specific electronic forwarding addresses can be prioritized in addition to, or in the alternative of, the prioritization of a set of electronic addresses, or tables. In this specific embodiment the processing subsystem 304 can be configured to scan the list of electronic forwarding addresses associated with entries that have their conditions satisfied. If, for example, a set of electronic forwarding addresses includes a prioritized address the processing subsystem 304 can be configured to retrieve just the prioritized electronic address, or in another embodiment the processing subsystem 304 can be configured to retrieve sets of electronic forwarding addresses that do not conflict with the prioritized electronic forwarding address.

Continuing with the description of FIG. 3, once the list of electronic forwarding addresses has been finalized by the processing subsystem 304, the list can be transmitted to the protocol conversion subsystem 306. For example, in some embodiments of the present disclosure the protocol conversion subsystem 306 can be configured to receive the message 302 and a list of electronic forwarding addresses, e.g., one or more sets of electronic forwarding addresses. In some instances, the list can include electronic forwarding addresses that are associated with email accounts, instant message aliases, or telephone numbers for example. The protocol conversion subsystem 306 in this example embodiment can be configured to generate a message for each electronic forwarding address in the list, e.g., forwarded messages 314; and the protocol conversion subsystem 306 can be configured to generate a copy of the message 302 in accordance with the format required for each protocol. For example, the protocol conversion subsystem 306 can be configured to generate a message conforming to the simple mail transfer protocol (SMTP) if the electronic forwarding address is an email account and add the body and/or attachments to the email. In another specific example, the protocol conversion subsystem 306 can be configured to generate a message conforming to the OSCAR instant messaging protocol if the electronic forwarding address is a instant messaging alias for a instant messaging system such as ICQ®, AIM® or any instant messaging system that utilizes the OSCAR protocol. Once one or more forwarded messages 314 have been generated by the protocol conversion subsystem 306 the forwarded messages 314 can be routed to the appropriate delivery system. For example, SMS/MMS forwarded messages 314 can be routed to the SMSC 210. Forwarded messages 314 that conform to an email protocol, or an instant message protocol can be routed to gateway 316 and sent via a packet based network such as the Internet to email server 262 or instant messaging system 260.

Figure 4:
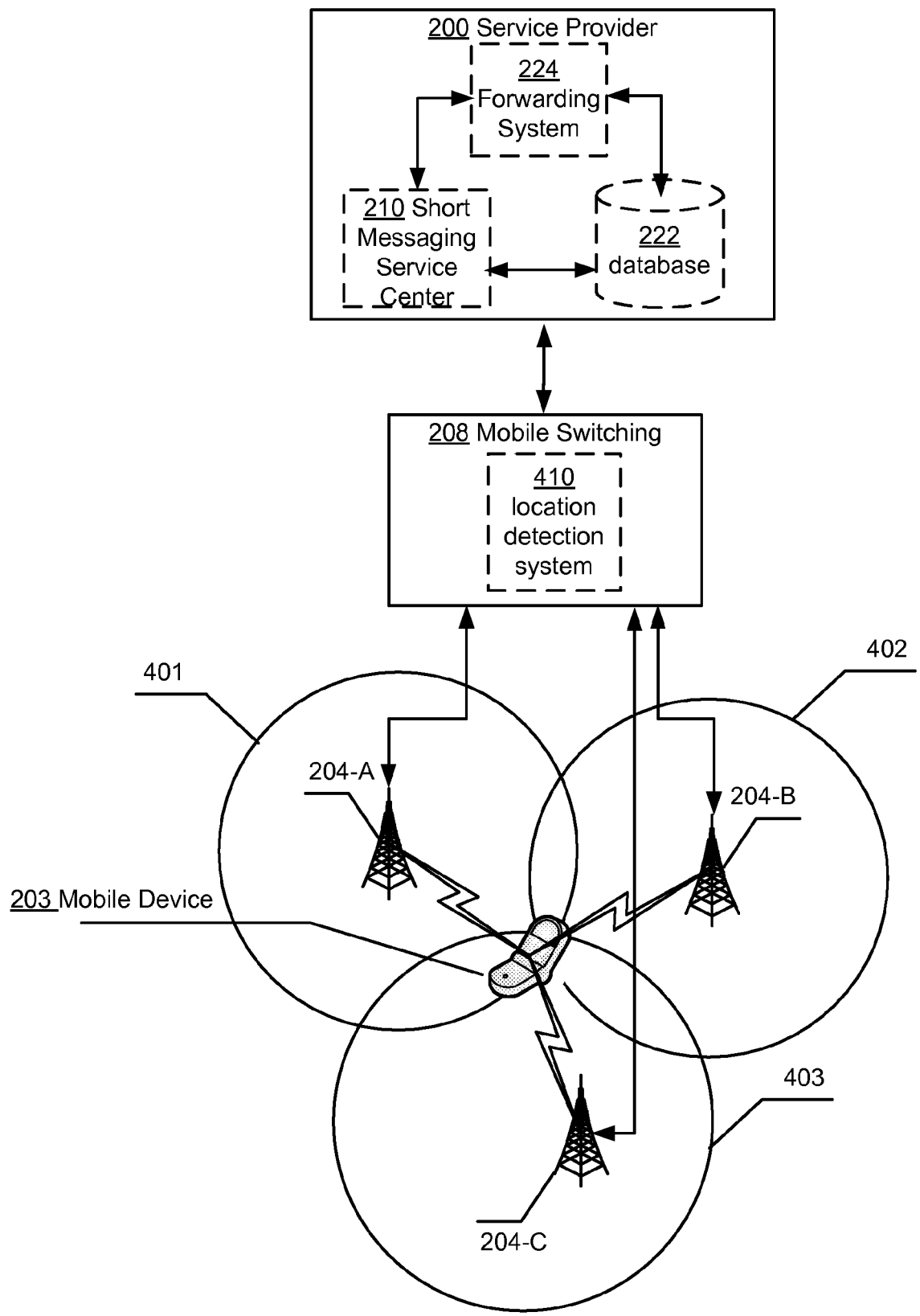
FIG. 4 depicts an example operational environment describing techniques related to identifying a location of a mobile device.

Referring now to FIG. 4, it depicts an example operational diagram depicting techniques related to determining the location of a mobile device 203. As depicted by FIG. 4, in some embodiments a mobile network maintained by a service provider 200 can be divided up into a group of cells such as cells 401-403 and each cell can include a base station such as 204-A through 204-C. Overlapping of cells of coverage can be beneficial since then the mobile device 203 will then be able to detect signals from multiple base stations as it moves through the mobile network. According to some embodiments of the present disclosure, base stations 204-A through 204-C located in their respective cells can be used to determine the present location of the mobile device 203 from time to time and forward the location information to the MSC 208. As is illustrated by FIG. 4, in some instances signals sent by the mobile device 203 can be used to determine a location of the mobile device 203 and this information can be stored in for example, the characteristic database 312 of FIG. 3 where it can be accessed by the forwarding system 224. For example, the location of the mobile device 203 can be recorded as the mobile device 203 moves through the network. The mobile device 203 can monitor the signal strength of the broadcast control channel used by each bases station 204-A through 204-C and connect to the base station that has the strongest signal, for example base station 204-A. In this example, when the mobile device 203 attempts to connect to base station 204-A for example, the mobile device 203 can send a location update request. The mobile switching center 208 can be configured to receive the request and transmit information that identifies the current base station 204-A that the mobile device 203 is connected with to the characteristic database 312. This location information can be subsequently used by the forwarding system 224 determine how to forward SMS/MMS messages.

In other embodiments of the present disclosure, the service provider 200 can employ more accurate location technology to determine a more precise location of mobile device 203. In one example embodiment, the mobile switching center 208 can include a location detection system 410 configured to determine the location of the mobile device 203 and forward the location information to the characteristic database 312 of FIG. 3. For example, the location detection system 410 can in some embodiments include components similar to computer 20 of FIG. 1. The location detection system 410 can additionally include circuitry, e.g., hardware, software, or a combination thereof configured to receive signals from the base stations 204-A through 204-C and calculate the location of the mobile device 203. In certain embodiments, base stations 204-A through 204-C can be equipped with location measurement units. In these embodiments, the mobile device 203 can be configured to transmit a RF signal at predetermined time periods and the mobile switching center 208 can be configured to calculate the location of the mobile device 203 from the signal by measuring the difference in time of arrival of the signal received by each location measurement unit at the base stations 204-A through 204-C. The location detection system 410 can be configured to match up the time of arrival of a given signal at pairs of base stations to determine the difference in reception times. After these calculations are performed, the location detection system 410 can be configured to compute an approximate latitude and longitude of the mobile device 203 based on the differences between different pairs of base stations and transmit this approximation to the characteristic database 312.

In another example embodiment, time of arrival techniques can be used to determine the location of the mobile device 203. In these embodiments, the mobile device 203 can be configured to transmit a RF signal at predetermined time periods and the mobile switching center 208 can be configured to calculate the location of the mobile device 203 from information that identifies the time that each base station such as base station 204-A through 204-C received the signal. The position of the mobile device 203 can be computed by the location detection system 410 of the mobile switching center 208 based on the fact that the signal speed is known and the location of the base stations 204-A through 204-C are known. After the calculations are performed, the location detection system 410 can be configured to compute an approximate latitude and longitude of the mobile device 203 and transmit this approximation to the characteristic database 312.

Figure 5:
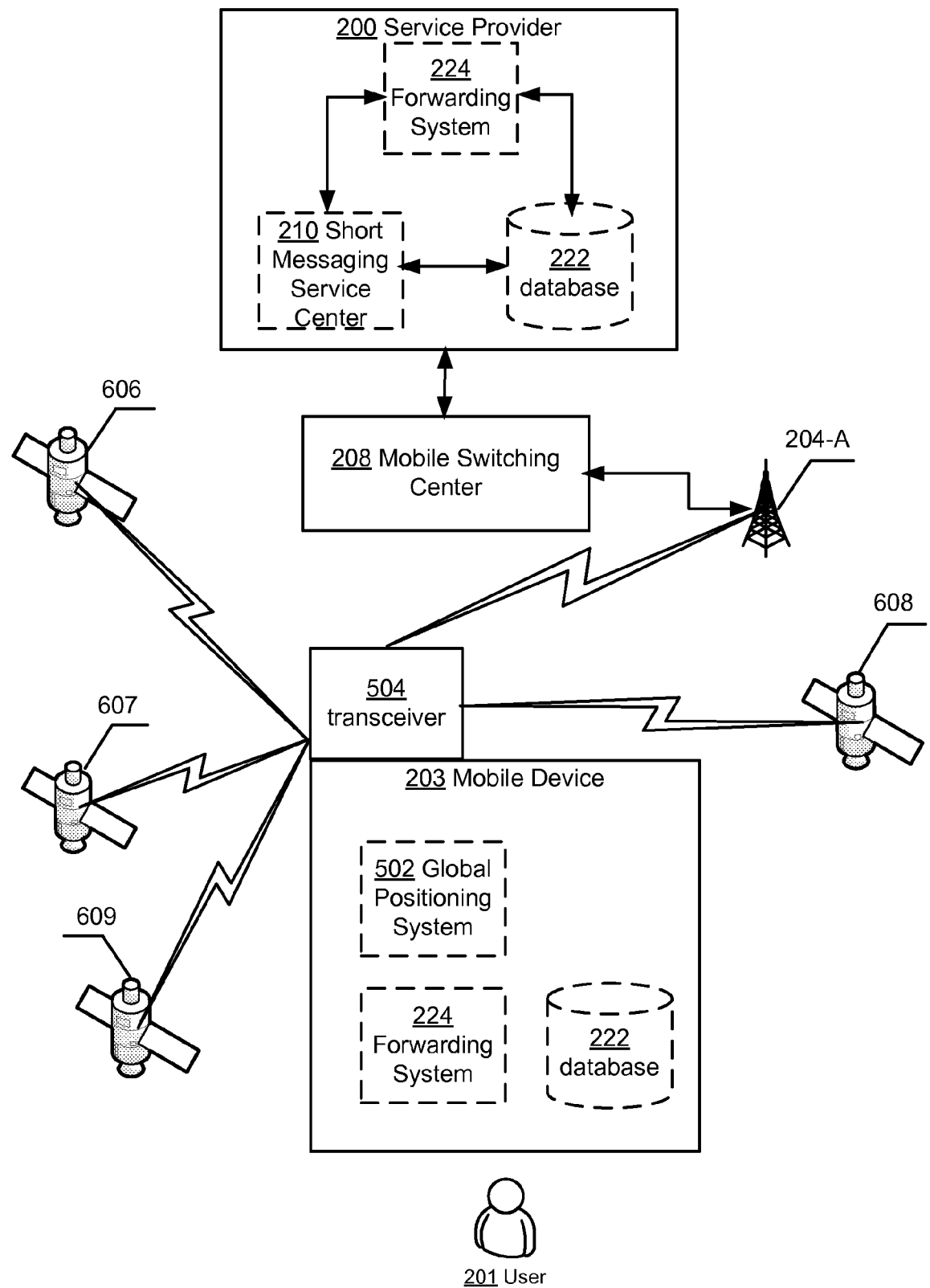
FIG. 5 depicts an example operational environment describing techniques related to identifying a location of a mobile device.

Referring now to FIG. 5, it depicts an example operational diagram depicting techniques related to determining the location of a mobile device 203. In this example embodiment, the mobile device 203 can be equipped with a GPS system 502. The GPS system 502 can be configured to receive signals from 4 satellites such as satellites 606-609 that can continuously transmit information such as the current time and their location. The GPS system 502 can be configured to receive the signals from the satellites 606-609 and use the signals to calculate the time and the current position of the GPS system 502. As illustrated in FIG. 5, in some instances GPS positional information can be used by the forwarding system 224 that can be optionally located in the mobile device 203 and/or located at the service provider 200 to determine how to forward a SMS/MMS message.

In at least one example embodiment of the present disclosure, the mobile device 203 can be configured to transmit one or more signals indicative of the location determined by the GPS system 502 to characteristic database 312. In this example embodiment, the mobile device 203 can be configured to transmit a RF signal to a base station 204-A that includes information that identifies the mobile device's GPS coordinates. In at least one example embodiment the coordinates can be transmitted during a location update procedure that a mobile device 203 may initiate when the mobile device 203 disconnects from one base station 204-A and connects with another base station 204-B as described above in FIG. 5. In this example embodiment the coordinates can be inserted in the location update request to conserve battery power. In other example embodiments the mobile device 203 can transmit an RF signal from time to time indicative of the GPS coordinates to a base station that is servicing the mobile device 203.

Figure 6:
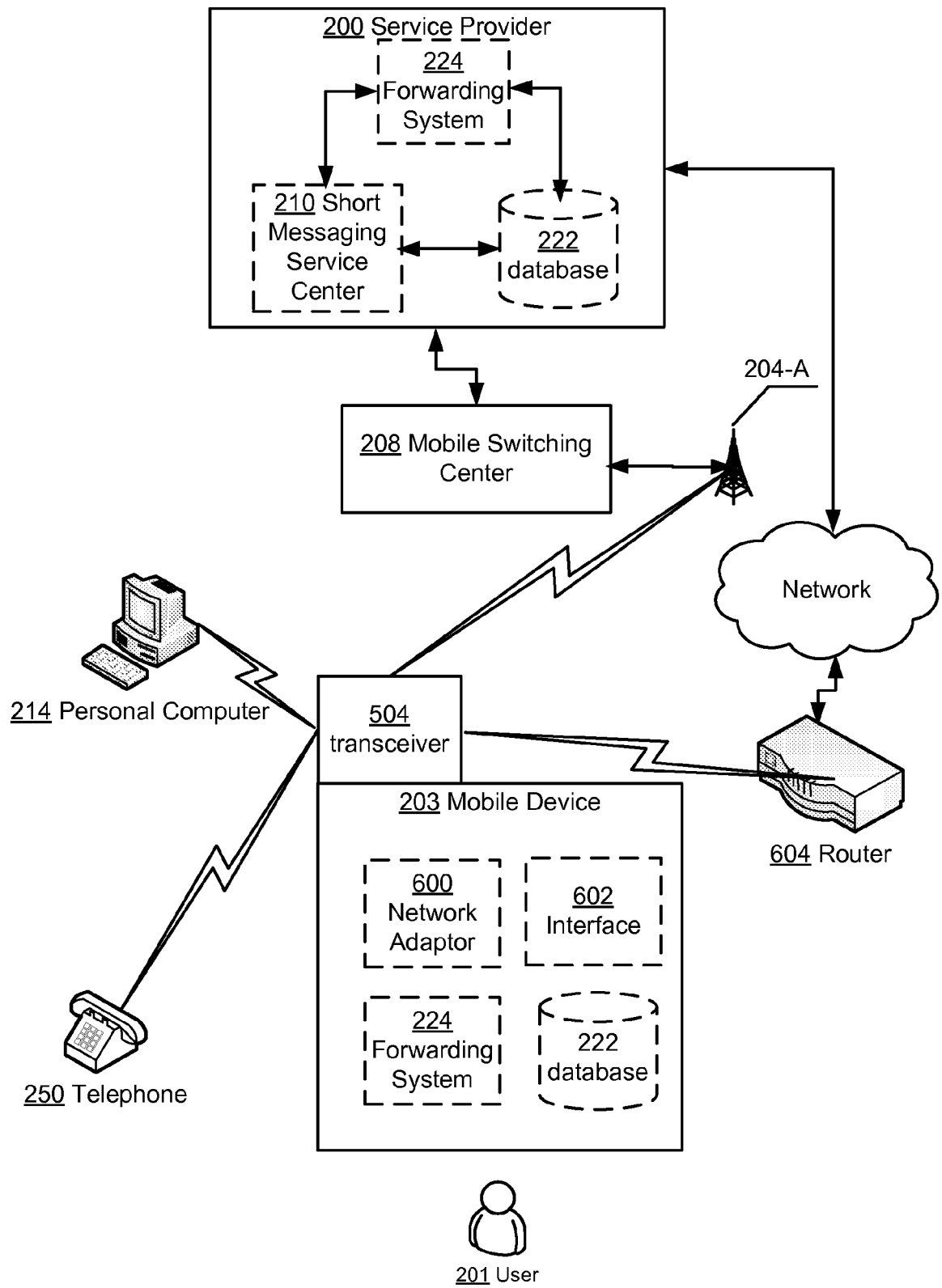
FIG. 6 depicts an example operational environment describing techniques for a mobile device to connect with local devices.

Referring now to FIG. 6, it depicts an example operational environment describing techniques for a mobile device to connect with local devices. Generally, FIG. 6 depicts an example mobile device 203 that can be configured to include components similar to mobile device 203 described in FIG. 2 through FIG. 5. In at least one example embodiment the mobile device 203 can include a network adaptor 600. The network adaptor 600 can include, but is not limited to, a Bluetooth adaptor, and/or Wi-Fi adaptor such as a radio that sends and receives signals conforming to a 802.11 standard. In addition, in some example embodiments the mobile device 203 can include an interface 602 such as a serial interface, e.g., a USB interface, or an Ethernet adaptor operable to allow the user 201 to connect the mobile device 203 with other devices that include such an interface, e.g., a personal computer 214 or a router. In at least one example embodiment the mobile device 203 can utilize either the network adaptor 600 or the interface 602 to connect with one or more local devices in the area such as personal computer 214, telephone 250 and/or wireless router 604. The mobile device 203 can include circuitry, e.g., hardware, software, or a combination thereof, operable to create a profile for each local device it connects with and these profiles can be used by the forwarding system 224 to determine where and when to forward a SMS/MMS message. For example, a profile for a local device could include an identifier such as a serial number. When mobile device 203 connects to the local device the serial number of the local device could be discovered. The mobile device 203 can be configured to compare the serial number to a list of serial numbers and determine that a profile for the device exists. In the event that a profile exists, a signal that indicates that the mobile device 203 is connected to a known local device can be stored in the characteristic database 312. In another embodiment, the unique identifier could be a GUID, or the SSID of a wireless network provided by wireless router 604. In a specific example, a user 201 may create a profile for a wireless router 604 that services a ferry that the user 201 travels on frequently. The profile can include the SSID of the wireless network on the ferry and can include a set of forwarding addresses. The set of forwarding addresses can be stored in the database 222 and associated with the SSID. When the user 201 boards the ferry for example, the transceiver of the mobile device 203 can be configured to detect radio frequency signals propagating from the wireless router 604. In this example embodiment, the SSID can be detected and a signal indicative of the SSID can be stored in the characteristic database 312. In the instance that a SMS/MMS message is received, the forwarding system 224 can check the characteristic database 312 and identify that the mobile device 203 is connected to a known local device. The forwarding system 224 can then search the database 222 for a set of forwarding addresses associated with the SSID of the wireless network.

Figure 7:
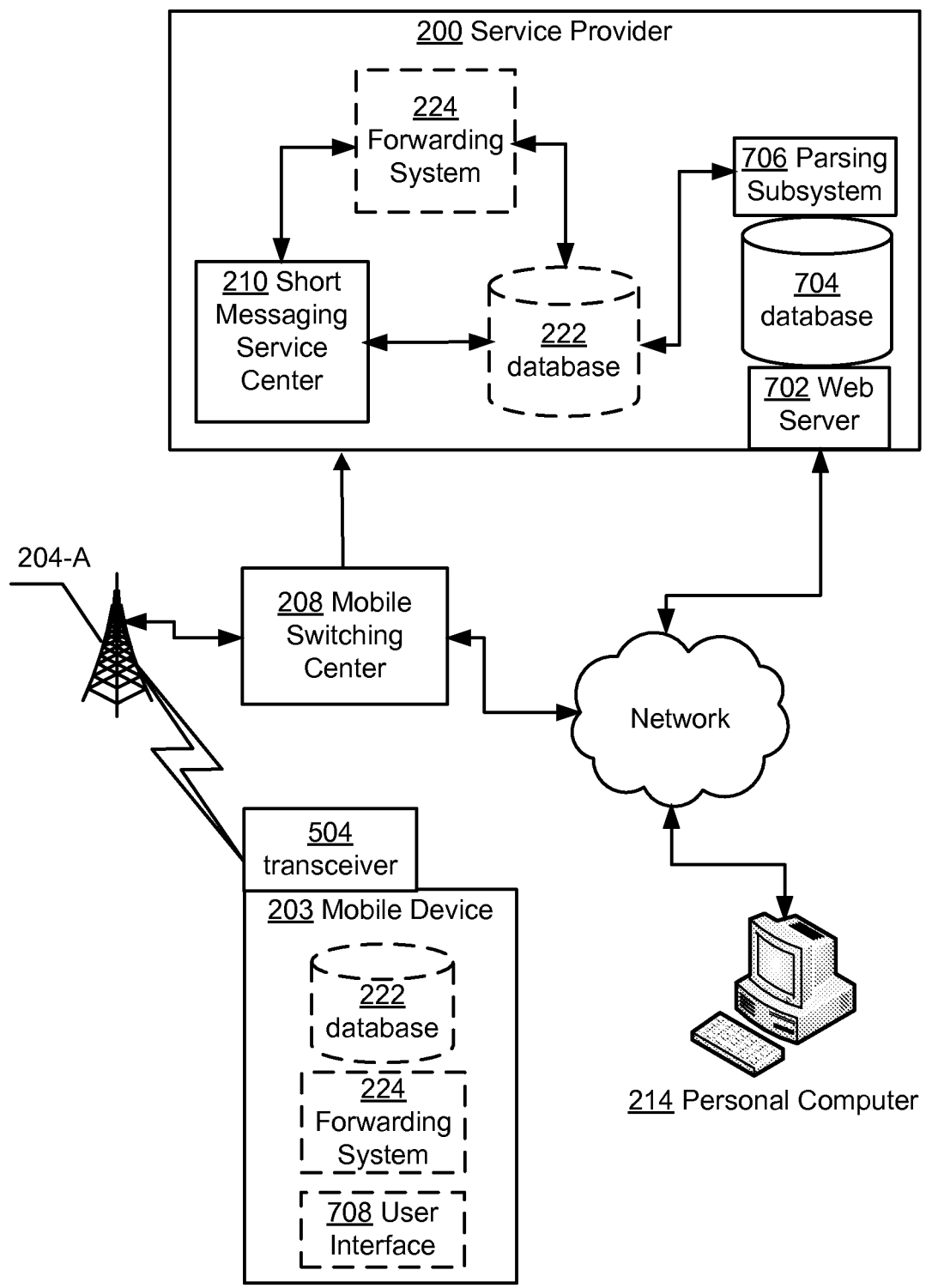
FIG. 7 depicts an example operational environment describing techniques related to configuring a forwarding system.

Referring now to FIG. 7, it depicts an example operational environment for configuring a forwarding system 224. As illustrated by FIG. 7, in some embodiments of the present disclosure, the forwarding system 224 located either at the service provider 200 or on the mobile device 203 can be configured by the user 201. For example, in certain embodiments of the present disclosure the forwarding system 224 can be configured by the user 201 via a personal computer 214 coupled to a network such as the Internet. In certain embodiments, the mobile device 203 can additionally connect to the network such as the Internet and configure the forwarding system 224. In certain embodiments, a series of webpage(s) can be published by a web server 702 maintained by the service provider 200. For example, the web server 702 may be configured to receive http requests with credentials associated with a user account over the Internet and reply to requests with webpage(s) that include information about the user's account. In at least one embodiment of the present disclosure the webpage(s) can include fields that allows the user 201 to select certain criteria and insert electronic forwarding addresses such as email addresses, mobile device numbers, instant messaging aliases, or telephone numbers of endpoints connected via the public switched telephone network. The criteria can be, for example, criteria related characteristics of the mobile device 203 and/or, criteria related metadata of incoming SMS/MMS messages. In some embodiments of the present disclosure the webpage(s) can be configured to allow the user 201 to prioritize certain criteria such as location based address sets, or prioritize a specific address set of a certain category, e.g., prioritizing a specific location. In a specific example where locations are selected by the user 201, the webpage(s) can be configured to allow the user 201 to input a street address such as the address of their office, the address of their home, and/or the webpage(s) can be configured to allow the user 201 to select a location option such as whether the mobile device 203 is in or out of network, e.g., roaming. For each location, the user 201 can add one or more electronic forwarding addresses that the user 201 wants to associate with the location. Once the user 201 is satisfied with the sets and priority settings, the user 201 can select a save button rendered in the webpage(s) and the personal computer 214 or mobile device 203 can transmit one or more packets indicative of the user's input to the web server 702. As illustrated by FIG. 7, the information can be stored in the database 704 of the web server 702. A parsing subsystem 706 that includes circuitry, e.g., hardware, software, or a combination thereof can be configured to extract the configuration information stored in the database 704 and transform the information into a format used by the database 222. One of skill in the art can appreciate that in some embodiments the parsing subsystem 706 may be a component of the web server 702, or the database 222 and that the parsing subsystem 706 is depicted as separate for clarity purposes and ease of understanding. Once the information is stored in database 222 it can be used by the forwarding system 224 when forwarding messages to electronic forwarding addresses. In at least one embodiment of the present disclosure, the mobile device 203 may include the forwarding system 224 and the configuration information can be transmitted to the mobile device 203 in a SMS control message. The SMS control message can be processed by the mobile device 203 and the configuration parameters can be stored in the database 222. Once the information is stored in database 222 of the mobile device 203 it can be used by the forwarding system 224 when forwarding messages to electronic forwarding addresses.

In some embodiments the configuration information can be input by the user 201 and entered into the database 222 of the mobile device 203. For example, the mobile device 203 can include a user interface 708 such as a graphical user interface and/or a keyboard that can be configured to receive configuration information. The mobile device 203 can be configured to include a parsing subsystem (not shown) similar to that described above and the parsing subsystem (not shown) can be configured to transform the information into a format usable by the database 222. As one of skill can appreciate, in some embodiments the parsing subsystem (not shown) may not be necessary if the user input is already in a format consumable by the database 222. Once the information is stored in database 222 of the mobile device 203 it can be used by the forwarding system 224 when forwarding messages to electronic forwarding addresses.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

What is claimed:

1. A method comprising:
   receiving a message comprising a body and an electronic destination address;
   identifying a location of a mobile device associated with the electronic destination address;
   identifying an arrival time for the message;
   determining a location of the mobile device;
   determining that the location of the mobile device is similar to a location stored in a database management program;
   identifying an electronic forwarding address that is associated with, but different from, the electronic destination address for forwarding the message in accordance with the identified location of the mobile device and the identified arrival time for the message, wherein:
      the electronic forwarding address is associated with the identified characteristic and the identified time in a database management program; and
      the location stored in the database management program is related to the electronic forwarding address; and
   forwarding the body of the message to the electronic forwarding address.

2. The method of claim 1, wherein identifying the location of the mobile device further comprises:
   receiving global positioning coordinates indicative of the location of the mobile device;
   storing the location of the mobile device in a database management program; and
   retrieving the location of the mobile device.

3. The method of claim 1, further comprising:
   identifying an electronic originator address in the message; and
   selecting the electronic forwarding address for the message in accordance with the identified location of the mobile device, the identified arrival time for the message, and the identified electronic originator address.

4. The method of claim 1, further comprising:
   receiving account configuration information, wherein the account configuration information identifies the electronic forwarding address, and a location; and
   generating a relationship between the electronic forwarding address, the location, and the electronic destination address.

5. The method of claim 1, wherein identifying the location of the mobile device further comprises:
   determining that the mobile device is roaming; and
   selecting the electronic forwarding address in accordance with the determination that the mobile device is roaming.

6. A device comprising:
   a processor; and
   memory coupled to the processor, the memory comprising executable instructions that when executed by the processor cause the processor to effectuate operations comprising:
      receiving, by a transceiver of a mobile device, a message comprising a destination address and a body;
      identifying, by the mobile device, a characteristic of the mobile device;
      receiving information identifying a time that the message arrived;
      determining a location of the mobile device;
      determining that the location of the mobile device is similar to a location stored in a database management program;
      selecting an electronic forwarding address that is associated with, but different from, a destination address associated with the mobile device for forwarding the message in accordance with the identified characteristic and the information identifying the time the message arrived, wherein:
         the electronic forwarding address is associated with the identified characteristic and the identified time in a database management program; and
         the location stored in the database management program is related to the electronic forwarding address;
      transmitting, by the transceiver of the mobile device, the body of the message to the electronic forwarding address.

7. The device of claim 6, wherein the characteristic identifies a location of the mobile device.

8. The device of claim 6, wherein the characteristic identifies a local device the mobile device is in communication with.

9. The device of claim 6, the operations further comprising:
receiving information identifying an electronic originator address of the message; and
selecting at least one electronic forwarding address in accordance with the identified characteristic of the mobile device, the information identifying the time the message arrived, and the electronic originator address of the message.

10. The device of claim 6, the operations further comprising:
receiving a message from a short message service center, the message identifying the identified characteristic and the electronic forwarding address;
storing a relationship between the identified characteristic and the electronic forwarding address.

11. The device of claim 6, the operations further comprising:
receiving input, the input identifying the identified characteristic and the electronic forwarding address; and
storing a relationship between the identified characteristic and the electronic forwarding address.

12. A computer readable storage medium that is not a propagating signal, the computer readable storage medium comprising computer readable instructions that when executed by a processor cause the processor to effectuate operations comprising:
receiving a message that comprises an body and an electronic destination address, wherein the electronic destination address is associated with a mobile device;
identifying a characteristic of the mobile device;
identifying a time that the message arrived;
determining a location of the mobile device;
determining that the location of the mobile device is similar to a location stored in a database management program;
identifying an electronic forwarding address that is associated with, but different from, the electronic destination address in accordance with the identified characteristic and the identified time that the message arrived, wherein:
the electronic forwarding address is associated with the identified characteristic and the identified time in a database management program; and
the location stored in the database management program is related to the electronic forwarding address;
retrieving the electronic forwarding address; and
forwarding the body of the message to the electronic forwarding address.

13. The computer readable storage medium of claim 12, wherein the characteristic indicates that the mobile device is roaming.

14. The computer readable storage medium of claim 12, wherein the identifying the electronic forwarding address associated with the identified characteristic comprises:
determining that the mobile device is proximately located to a device, the device associated with a unique identifier; and
determining that the unique identifier of the device is the same as a unique identifier stored in the database management program, wherein the unique identifier stored in the database management program is related to the electronic forwarding address.

15. The computer readable storage medium of claim 12, wherein identifying the electronic forwarding address associated with the identified characteristic comprises:
identifying a plurality of sets of electronic forwarding addresses;
removing duplicative electronic forwarding addresses thereby generating a subset of forwarding electronic addresses; and
generating a plurality of copies of the message, one copy for each electronic forwarding address in the subset.

16. The computer readable storage medium of claim 12, wherein forwarding the message to the electronic forwarding address further comprises:
appending text identifying that the message was forwarded to the forwarded message.

17. The computer readable storage medium of claim 12, the operations further comprising:
generating a message addressed to a message originator, wherein the generated message indicates that the message was forwarded to the electronic forwarding address.

* * * * *